US010336536B2

(12) United States Patent
Glisson

(10) Patent No.: US 10,336,536 B2
(45) Date of Patent: Jul. 2, 2019

(54) SYSTEM AND DEVICE FOR YARD WASTE COLLECTION

(71) Applicant: Joseph Malik Glisson, Cincinnati, OH (US)

(72) Inventor: Joseph Malik Glisson, Cincinnati, OH (US)

( * ) Notice: Subject to any disclaimer, the term of this patent is extended or adjusted under 35 U.S.C. 154(b) by 0 days.

(21) Appl. No.: 15/451,335

(22) Filed: Mar. 6, 2017

(65) Prior Publication Data

US 2018/0251293 A1   Sep. 6, 2018

(51) Int. Cl.
| | | |
|---|---|---|
| *A01G 20/43* | (2018.01) | |
| *B65F 1/10* | (2006.01) | |
| *B65F 1/14* | (2006.01) | |
| *A01D 42/00* | (2006.01) | |
| *A01G 20/47* | (2018.01) | |
| *A01G 13/02* | (2006.01) | |

(52) U.S. Cl.
CPC ............ *B65F 1/105* (2013.01); *A01D 42/005* (2013.01); *A01G 20/43* (2018.02); *A01G 20/47* (2018.02); *B65F 1/14* (2013.01); *A01G 13/0262* (2013.01); *B65F 2240/138* (2013.01)

(58) Field of Classification Search
CPC ........ A01G 20/43; B65B 67/12; A47L 9/1427
USPC ........ 248/95, 97, 99, 100, 101, 907; 15/347, 15/352, 327.5, 405, DIG. 8
See application file for complete search history.

(56) References Cited

U.S. PATENT DOCUMENTS

| | | | | |
|---|---|---|---|---|
| 3,199,277 | A * | 8/1965 | Moody ................ | A01D 43/063 15/347 |
| 4,713,858 | A * | 12/1987 | Kelber ...................... | A47L 5/14 15/339 |
| 5,741,093 | A * | 4/1998 | Schonberg ............. | B65G 53/24 406/153 |
| 6,125,501 | A * | 10/2000 | Yip .......................... | A47L 5/24 15/344 |
| 6,574,829 | B1 * | 6/2003 | Marcum ................... | A47L 5/14 15/347 |
| 6,723,148 | B2 * | 4/2004 | Stass .................. | F02M 35/0203 123/198 E |
| 6,988,293 | B2 * | 1/2006 | Ritter ........................ | A47L 5/14 15/347 |
| 7,257,858 | B2 * | 8/2007 | Palazzolo ................. | A47L 5/14 15/246.2 |
| 7,284,732 | B1 * | 10/2007 | Lopa .................... | B65B 67/1233 248/101 |
| 7,506,403 | B2 * | 3/2009 | Svoboda ................... | A47L 5/14 15/347 |
| 7,617,566 | B2 * | 11/2009 | Chapman ................. | A47L 9/02 15/344 |
| 8,075,649 | B2 * | 12/2011 | Bosses ................. | A47L 9/1436 15/352 |

(Continued)

Primary Examiner — Terrell L McKinnon
Assistant Examiner — Michael McDuffie
(74) Attorney, Agent, or Firm — Theodore P. Cummings, Esq.

(57) ABSTRACT

The invention provides a closed system for collecting, mulching and storing natural yard waste in a manner that saves time and labor. Storage of the natural yard waste is enabled by use of off the shelf bags instead of customized bags that must be later dumped into a generic storage housing. The system is empowered by a device that is attachable to such off the shelf bags and fully uses their volume so that maximum storage is achieved.

16 Claims, 7 Drawing Sheets

(56) References Cited

U.S. PATENT DOCUMENTS

| | | | | |
|---|---|---|---|---|
| 8,266,763 | B1 * | 9/2012 | Hays | E01H 1/0836 15/347 |
| 8,732,892 | B2 * | 5/2014 | Laliberte | A01G 20/43 15/246.2 |
| 9,206,574 | B2 * | 12/2015 | Parker | E03F 1/002 |
| 2006/0254021 | A1 * | 11/2006 | McRedmond | A47L 9/14 15/328 |
| 2009/0289154 | A1 * | 11/2009 | Gabriel | B65B 67/12 248/99 |
| 2011/0247170 | A1 * | 10/2011 | Jones | A47L 7/00 15/347 |
| 2014/0294507 | A1 * | 10/2014 | Parker | E02B 11/005 405/45 |
| 2014/0294508 | A1 * | 10/2014 | Parker | E02B 11/005 405/45 |
| 2016/0097175 | A1 * | 4/2016 | Parker | E03F 1/005 405/184.4 |

\* cited by examiner

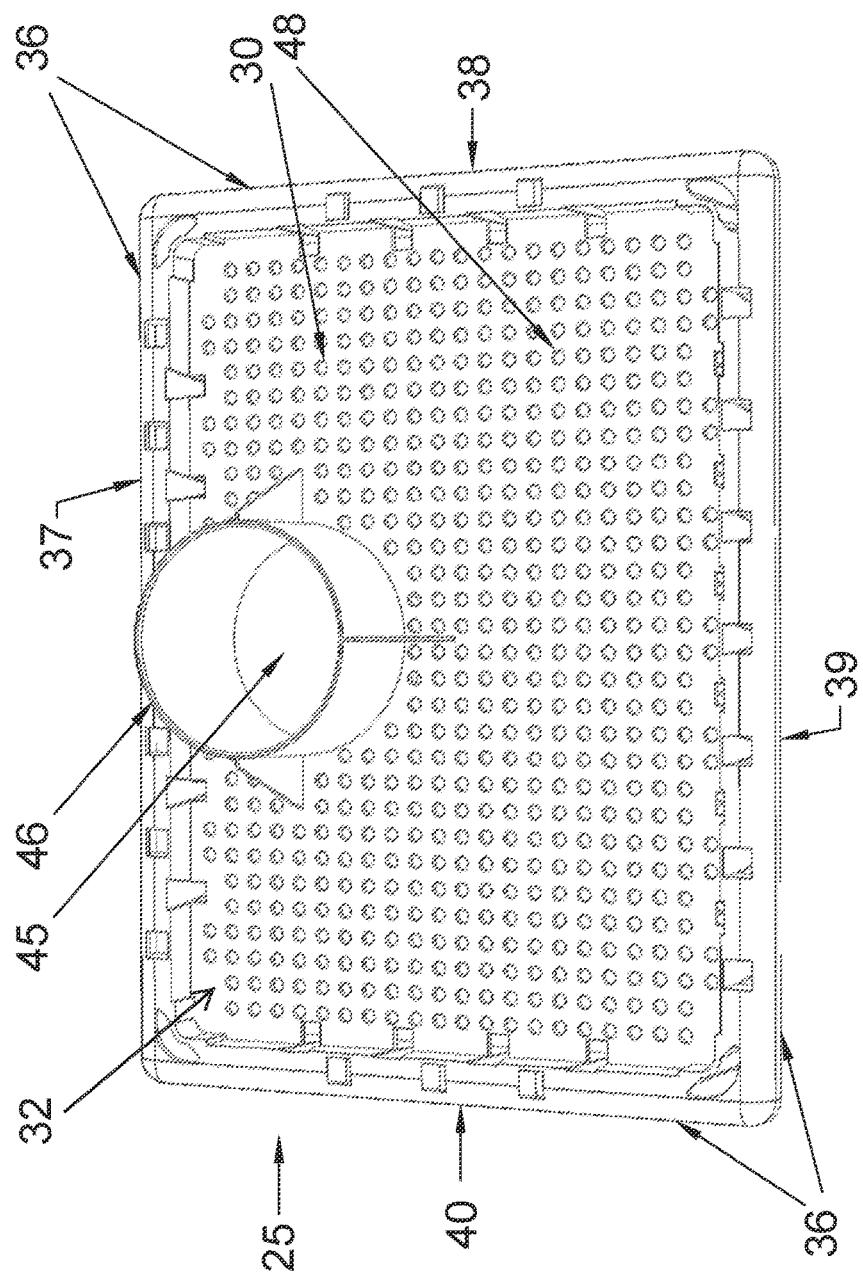

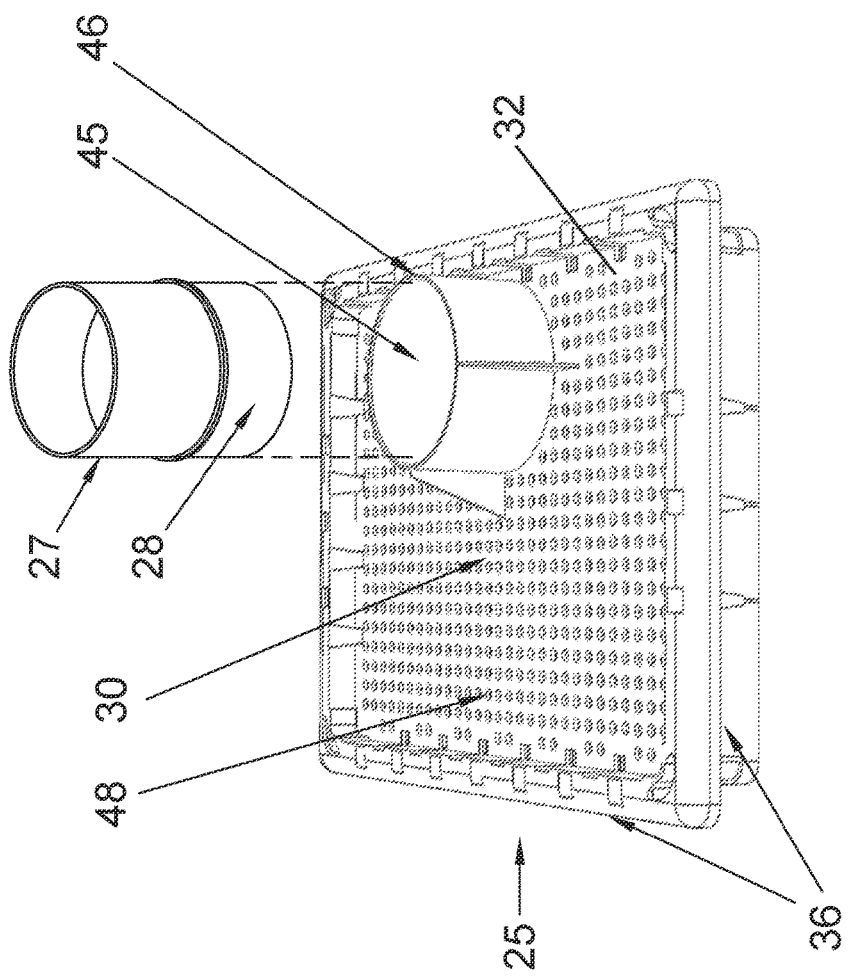

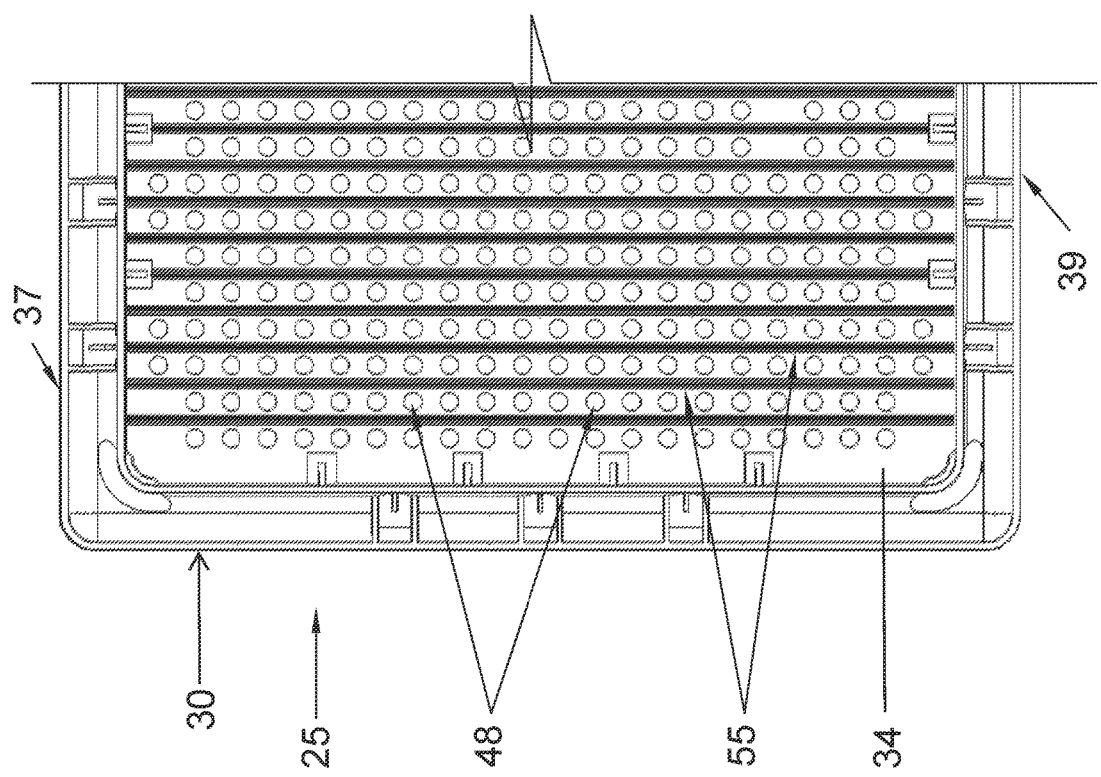

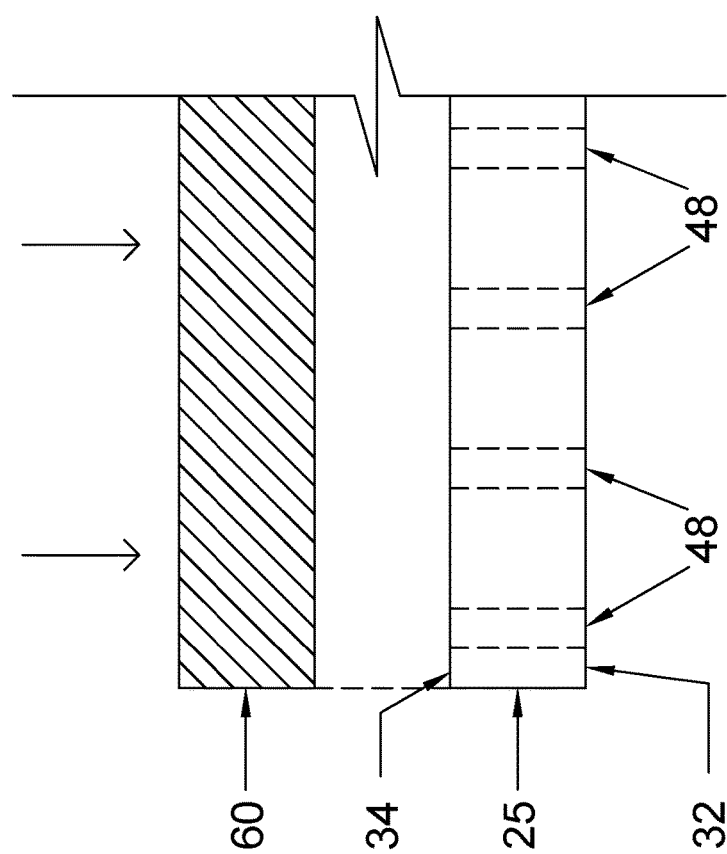

SYSTEM AND DEVICE FOR YARD WASTE COLLECTION

PRIORITY CLAIM

This nonprovisional patent application is a divisional application of U.S. patent application Ser. No. 14/620,652 filed on Feb. 12, 2015.

FIELD OF THE INVENTION

The invention provides a system for collecting, mulching and storing yard waste in a singular manner. More specifically, the system herein connects all three needful abilities—collecting, mulching and storing—in a manner that vastly reduces the time and labor required to accomplish the task of properly disposing of yard waste.

BACKGROUND OF THE INVENTION

The task of collecting and bagging yard waste is arduous. It requires a vast amount of time and is usually a multi-step process. First, the waste must be centrally collected. Next, it must be placed into suitable receptacles therefor (e.g., yard waste can, yard waste bags, and the like). Finally, if possible, it must be made into smaller parts (i.e., mulched) for either more efficient waste handling or use in some other landscaping capacity.

Often, the task of collecting and handling yard waste thusly is, in addition to being time intensive, is also very labor intensive. In large areas of a quarter acre or more, more than one person must be used to perform this kind of labor intensive work. In commercial applications, especially, like those done by professional landscapers, labor costs can stifle profits in business and impede the ability for business persons to do higher value and more profitable work.

Various devices known in the art collect yard waste. For example, devices that vacuum grass and leaves are well known. Usually, these types of devices connect to a bag created by the device's manufacturer to fit onto the device. Once yard waste fills its bag, the bag is disconnected. Yard waste in the bag is then transferred to another receptacle for later handling and/or waste purpose. Devices that mulch received yard waste are also well known as secondary components to devices that collect, by vacuuming, yard waste. Such mulch devices, which are often internal to a yard waste collection device, while not common, are well known by persons of skill in the art.

What has been missing in both above approaches is the ability, in a single system, to combine the collection, mulching and storage of yard waste in as simplistic and labor efficient manner as is possible. Such a system would reduce the time of collection of yard waste and reduce the labor intensity, both in number of persons needed and time required. Ideally, a single collection, mulching and yard waste storage system would enable the use of commercially available yard waste bags thereby eliminating the need to collect and dump from one bag into another. The invention discussed herein seeks to solve all of the problems of the foregoing.

BRIEF SUMMARY OF THE INVENTION

Accordingly, the provided invention a system for collecting, mulching and storing yard waste in a highly efficient manner. The system comprises a collection device for collecting yard waste, a mulching device connected to the collection device, and a bag fitting device connected to the mulching device. The bag fitting device is connectable to a bag for final collection of yard waste collected by said collection device.

The preferred collection device usable in this system is a vacuuming device that uses powered suction to gather leaves, grass and other kinds of natural yard waste. Once collected, such yard waste is drawn into a mulching device connected to the collection device. Preferably, the collection device feeds yard waste into the mulching device. Also preferably, the mulching device is an internal device fitted within the collection device. More specifically, the preferred collection device herein also contains a mulching device therein that is an internal component.

The bag fitting device herein is designed to connect directly to the collection device and to a suitable receptacle for receiving the yard waste. The bag fitting device may comprise two or more parts operating together feed yard waste flowing from the collection device to a receptacle. For example, the bag fitting device herein preferably comprises a hose of suitable diameter that is attached to a bag fitting device. The bag fitting device can be of a square, rectangular, oval, or elliptical configuration depending up manufacturer's design and/or configuration of the yard waste receptacle.

In practice, the bag fitting device at least partially inflates a receptacle suitable for yard waste. Such inflation helps to ensure that the receptacle is opened to a near or near-to-full capacity. In another embodiment herein, the bag substantially inflates the yard waste receptacle. Ideally, a suitable receptacle for yard waste contemplated herein is a yard waste bag of the kind to be subsequently described herein.

Also provided herein is a bag fitting device for enabling the storing of collected yard waste. The bag fitting device comprises a screen having a first side and second side positioned oppositely to the first side. A border is positioned about the screen. The border encloses the screen. The border has a first side, a second side positioned perpendicular to the first side, a third side positioned oppositely to the first side and perpendicular to the second side, and a fourth side positioned oppositely to the second side and perpendicular to the first side and the third side. The bag fitting device is at least semi-rigid and preferably substantially rigid.

A primary hole is positioned within the screen. The primary hole has a first raised border on the screen first side and a second raised border on the screen second side. The diameter of the primary hole ranges from about 0.25 inches to about 6 inches. Preferably, the diameter of the primary hole ranges from about 2 inches to about 8 inches, and preferably from about 3 inches to about 6 inches.

In addition to the primary hole, at least two secondary holes are positioned within the screen. The number of said secondary holes ranges from about 2 to about 800. The diameter of each secondary hole ranges from about 0.05 inches to about 1 inch.

The second side of the screen comprises one or more ribs, each rib extending at least partially between the first side to the third side of the screen. In practice, the screen comprises at least about 2 to about 50 ribs. Most ideally, the screen comprises from about 10 to about 30 ribs.

The bag fitting device is fittable within an opening of a pliable container. The opening of the pliable container is closable about the bag fitting device. The border of the bag fitting device comprises at least two bag attachment clips. Preferably, the border comprises at least one bag attachment clip on the first side, the second side, the third side and the fourth side.

In one embodiment herein, the first and second raised borders of the primary hole are circular and form a cylinder. The cylinder formed by the first raised border is the inlet, i.e., the side to which natural yard waste flows. For ease of use, the inlet comprises an attachable extender. The extender has a base. The base fits within the inlet. The cylinder formed by the second raised border is the outlet. In another embodiment herein, the first and second raised borders of the primary hole or rectangular (including a square configuration as well) and forms a four sided hole.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 3 is a front view of the bag fitting device used herein;

FIG. 4 is a side view of the bag fitting device used herein;

FIG. 5 is a partial front view of the second side of the screen of the yard waste device provided herein;

FIG. 7 is a partial exploded side view of a filter positioned above the screen herein.

DETAILED DESCRIPTION

By the term "natural yard waste" or "yard waste" it is meant herein to include leaves, grass, plants and all such naturally occurring flora and fauna found in nature.

By the term "yard waste bag" it is meant herein the kind of receptacle typically purchasable in store and formed from paper, plastic and the like.

By the term "pliable container" it is meant herein one or more types of yard waste bags that are not rigid or are semi-rigid but not fully rigid.

The invention herein provides a system for collecting, mulching and storing yard waste in a highly efficient manner. The system comprises a collection device for collecting yard waste, a mulching device connected to the collection device, and a bag fitting device connected to the mulching device. The bag fitting device is connectable to a bag for final collection of yard waste collected by said collection device.

The preferred collection device usable in this system is a vacuuming device that uses powered suction to gather leaves, grass and other kinds of natural yard waste. Once collected, such yard waste is drawn into a mulching device connected to the collection device. Preferably, the collection device feeds yard waste into the mulching device. Also preferably, the mulching device is an internal device fitted within the collection device. More specifically, the preferred collection device herein also contains a mulching device therein that is an internal component.

The bag fitting device herein is designed to connect directly to the collection device and to a suitable receptacle for receiving the yard waste. The bag fitting device may comprise two or more parts operating together to feed yard waste flowing from the collection device to a receptacle. For example, the bag fitting device herein preferably comprises a hose of suitable diameter that is attached to a bag fitting device. The bag fitting device can be of a square, rectangular, oval, or elliptical configuration depending up manufacturer's design and/or configuration of the yard waste receptacle.

In practice, the bag fitting device at least partially inflates a receptacle suitable for yard waste. Such inflation helps to ensure that the receptacle is opened to a near or near-to-full capacity. In another embodiment herein, the bag substantially inflates the yard waste receptacle. Ideally, a suitable receptacle for yard waste contemplated herein is a yard waste bag of the kind to be subsequently described herein.

Figure 1:
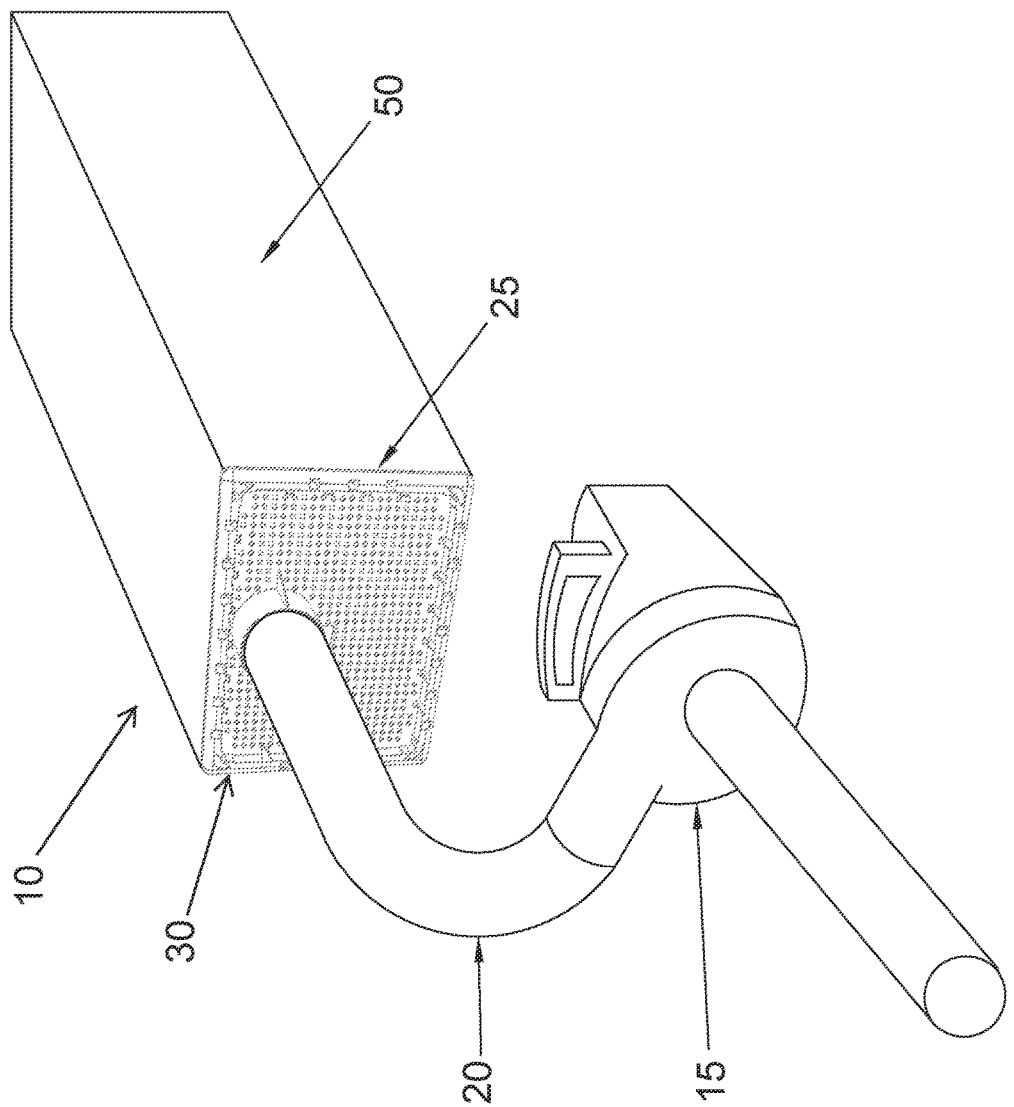
FIG. 1 is a perspective drawing of the yard waste collection system claimed herein.

FIG. 1 is a perspective drawing of the yard waste collection system 10 claimed herein. Shown is yard waste device 15 that is an electro-mechanical device useful for collecting leaves, grass and the like. As shown, yard waste device 15 is connected to yard waste bag 50 via connecting tube 20. Bag fitting device 25 connects to yard waste bag 50 and connecting tube 20. Such connection enables the removal of yard waste from fitting device 25 to yard waste bag 50.

Ideally, yard waste device 15 draws air into it via an air suction system like those known by persons of skill in the art for such yard waste device. That is, it is a leaf vacuum device like that produced and manufactured by Black & Decker® with their BV5600 High Performance Blower VAC mulcher. Once drawn in, it is, preferably, mulched (i.e., pulverized and/or broken into smaller particles). After mulching, such particles are blown out of yard waste device 15.

As mulched particles are blown out of yard waste device 15, they are transported through connecting tube 20. Connecting tube 20 has a diameter ranging from about 2 inches to about 8 inches, and more preferably ranging from about 3 inches to about 6 inches. Connecting tube 20 is either removably attached to an exit hole of yard waste device 15 or is permanently attached to the exit hole of yard waste device 15. Regardless of attachment, connecting tube 20 extends from the exit hole of yard waste device 15 to a commensurate hole in bag fitting device 25.

Bag fitting device 25 services several purposes in the composition of the yard waste system herein. First, it connects yard waste device 15 to yard waste bag 50. Second, it at least partially inflates yard waste bag 50 and preferably, substantially inflates it. Such at least partial inflation is important because it removes the necessity of a user having to open yard waste bag 50. In an optimal operative use, a user would merely attach the opening of yard waste bag 50 to bag fitting device 25, turn on yard waste device 15, and use its escaping vacuumed air to inflate yard waste bag 50. Third, bag fitting device 25 serves as a conduit for through which pulverized yard waste particles flow once leaving connecting tube 20.

It is important to note that the most preferred yard waste collection system 10 is a closed system that allows for the initial collection and final disposal of collected yard waste without stopping and without any intervening steps not contained wholly within the system.

Figure 2:
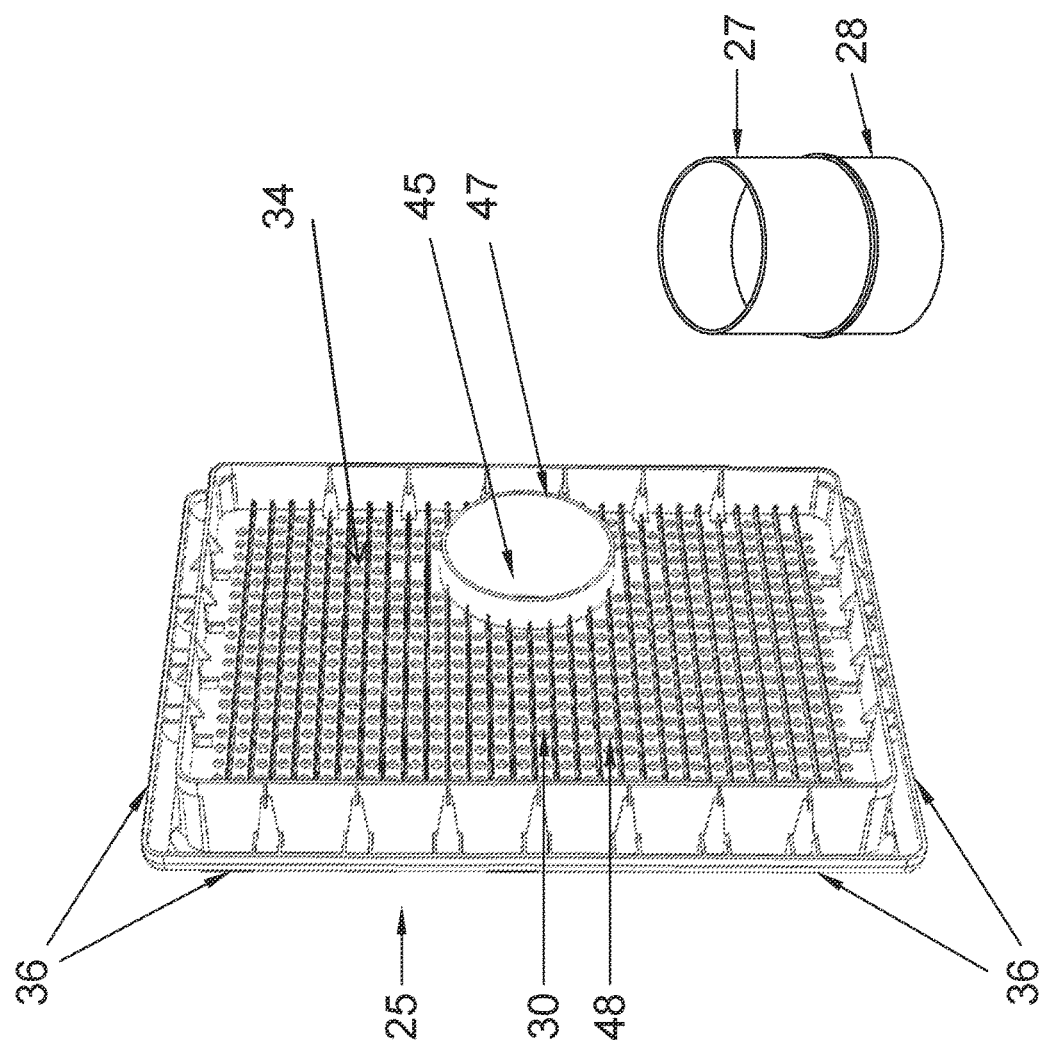
FIG. 2 is a perspective view of a bag fitting device used herein.

FIG. 2 is a perspective view of bag fitting device 25 herein. Bag fitting device 25 comprises screen 30 having first side 32 and second side 34 positioned oppositely to first side 32. Border 36 is positioned about screen 30. Border 36 encloses screen 30. Border 36 has a first side 37, a second side 38 positioned perpendicular to first side 37, a third side 39 positioned oppositely to first side 37 and perpendicular to second side 38, and a fourth side 40 positioned oppositely to second side 34 and perpendicular to first side 37 and third side 39. Bag fitting device 25 is at least semi-rigid and preferably substantially rigid.

A primary hole 45 is positioned within screen 30. Primary hole 45 has a first raised border 46 on the screen first side 32 and a second raised border 47 on the screen second side 34. The diameter of primary hole 45 ranges from about 1 inch to about 8 inches. Preferably, the diameter of primary hole 45 ranges from about 2 inches to about 8 inches, and preferably from about 3 inches to about 6 inches.

In addition to primary hole 45, at least two secondary holes 48 are positioned within screen 30. The number of secondary holes 48 ranges from about 2 to about 800. The diameter of each secondary hole 48 ranges from about 0.05 inches to about 1 inch.

As is shown in FIG. 5 herein, second side 34 of screen 30 comprises one or more ribs 55, each rib 55 extending at least partially between first side 37 to third side 39 of screen 30. In practice, screen 30 comprises at least about 2 to about 50 ribs 55. Most ideally, screen 30 comprises from about 10 to about 30 ribs 55. Ribs 55 provide structure to screen 30 and increase its rigidity when such construction is desired by a manufacturer. Also, ribs 55 provide certain conducive flow properties for air that escapes from yard waste bag 50. Further discussion of such flow of air into and out of yard waste bag 50 shall be had in greater detail hereinbelow.

As noted hereinabove, bag fitting device 25 is fittable within an opening of a pliable container like yard waste bag 50. The opening of the pliable container is closable about bag fitting device 25. Border 36 of bag fitting device 25 comprises at least two bag attachment clips (not shown). Preferably, border 36 comprises at least one bag attachment clip on its first side 37, second side 38, third side 39 and fourth side 40.

First raised border 46 and second raised border 47 of primary hole 45 are circular and together form a cylinder. The cylinder formed by first raised border 46 is the inlet since it is placed on first side 32 of screen 30, i.e., the side to which natural yard waste flows from yard waste 15. For ease of use, the inlet may comprise attachable extender 27. Extender 27 comprises base 28. Base 28 is configured to fit within first raised border 46. The cylinder formed by the second raised border 47 forms an outlet through which natural yard waste flows into yard waste bag 50. Extender 27, when used, comprises the same shape as primary hole 45; e.g., cylindrical, rectangular and the like.

Also provided in FIG. 2 is extender 27. Extender 27 fits onto primary hole 45 on the first side 32 of screen 30. The purpose of extender 27 is to facilitate the connection between bag fitting device 25 and connecting tube 20. There may be instances when using extender 27 enables a more secure or easier connection. In those cases, extender 27 provides an increased distance between screen 30 and bag fitting device 25. Ideally, extender 27 is substantially cylindrical as shown. Also ideally, it ranges in length from about 2 to about 10 inches. Most ideally, it ranges in length from about 3 to about 7 inches. The actual length employed is at manufacturer's discretion and depends upon the specific use of bag fitting device 25.

FIG. 3 is a front view of bag fitting device 25. Primary hole 45 is shown positioned off-center to screen 30. This position of primary hole 45 is considered to be optimal for the functionality of bag fitting device 25. When bag fitting device 25 is connected and yard waste bag 50 sits upon the ground, position of primary hole 45 is important. It has been inventively discovered that primary hole 45 positioned at or near the top of first side 37 of border 36, as is shown, enables optimal effectiveness of bag fitting device for the flow of yard waste from yard waste device 15.

It has been discovered that positioning of primary hole 45 at a central location on screen 30 is effective, but not as effective as its positioning shown in FIG. 3. Less effective still would be the positioning of primary hole 45 in an adjacent position to third side 39 of border 36. The importance of the positioning of primary hole 45 impacts the efficiency of the flow of collected yard waste from yard waste device 15 through connecting tube 20 and onto yard waste bag 50.

FIG. 4 is a side view of bag fitting device 25 herein. As shown, first raised border 46 of primary hole 45 extends above screen 30 of bag fitting device 25. As discussed hereinabove, first raised border 46 has a length ranging from about 2 inches to about 8 inches, and preferably from about 3 inches to about 6 inches.

Bag fitting device 25 can be made from multiple kinds of materials. For example, bag fitting device 25 may comprise wood, steel, iron, titanium, plastic, polypropylene, polyethylene and combinations of all of the foregoing.

As noted hereinabove, ribs 55 are positioned onto second side 34 of screen 30. Ribs 55 are preferably, but not necessarily made of the same material of which screen 30 is comprised. Also preferably, ribs 55 are at least substantially stiff and add rigidity to screen 30. As shown in FIG. 5 herein, ribs 55 extend vertically from first side 37 to third side 38 of border 36. Such extension is preferable but not necessary to the operation of screen 30. However, ribs 55 may extend at least three-fourths of the length of the distance between first side 37 and third side 39 of border 36.

In addition to providing the utility of rigidity to screen 30, ribs 55 also provide an additional important function. As air and mulched yard waste flow through primary hole 45, the air fills yard waste bag 50, and specifically the back of it. Substantially all of the air blown into yard waste bag 50 remains active and mobile so long as yard waste device 15 remains in operation. Because of such operation of yard waste device 15, air in yard waste bag 50 must be continually replenished and replaced. Secondary holes 48 serve as the means by which air may be expelled from yard waste bag 50 as new air enters therein through primary hole 45.

Ribs 55 also provide direction for air flow through secondary holes 48. In practice, as air moves back toward screen 30, air molecules slide along ribs 55 that, preferably, are oriented to direct air towards secondary holes 48. In this operation, ribs 55 may be tapered thereby providing efficient directionality of air flowing to and through secondary holes 48.

Figure 6C:
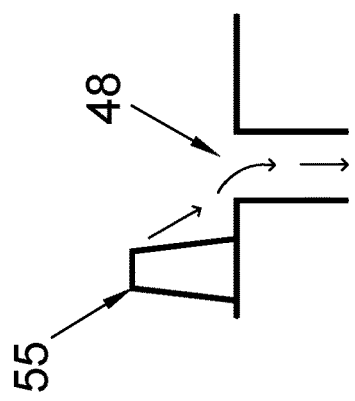
FIG. 6C is a cut side view of yet another embodiment of a rib herein.
Figure 6B:
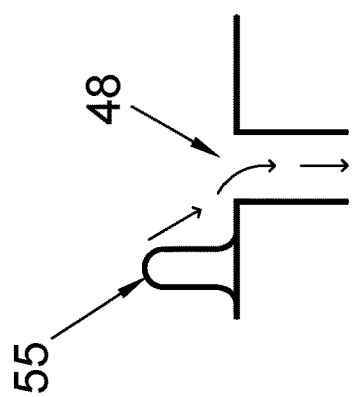
FIG. 6B is a cut side view of another embodiment of a rib herein.
Figure 6A:
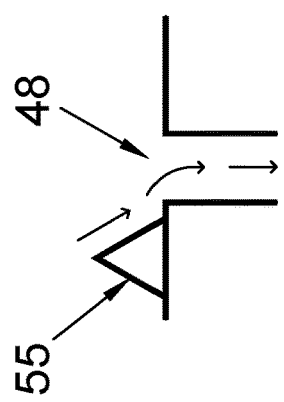
FIG. 6A is a cut side view of one embodiment of a rib herein.

FIGS. 6A, 6B and 6C provides three suitable examples tapered ribs 55 considered to be ideal for the efficient directionality of air flowing to and through secondary holes 48. Each of the shapes in FIGS. 6A, 6B and 6C provide a different shape of a rib 55. The common point of each figure, however, is that each also provides a sloped side. The objective of the slope side of ribs 55 shown in the figures herein is to provide the efficient directionality of flowing air to secondary hole 48.

The design of ribs 55 to provide the efficient directionality of air flow is preferred. However, ribs 55 that do not comprise ribs 55 having sloped sides are also useful. Their efficient directionality of air flow is diminished, though, in comparison to that of ribs 55 shown in FIBS 6A, 6B, and 6C. These figures show the flow of air from the sloped surfaces of ribs 55 into secondary holes 48. Specifically, it is believed that as air impacts ribs 55 and their sloped surfaces, such sloped surfaces aid in directing air to and through secondary holes 48.

FIG. 7 provides an exploded partial side view of screen 30 having filter 60 applied to second side 34 of screen 30. Also shown by the large arrows positioned downwardly toward filter 60 which represent the flow of air toward it. In practice, as air moves up from the back of yard waste bag 50 toward bag fitting device 25, it will flow through filter 60, to screen 30 and out through secondary holes 48. Filter 60 prevents mulched yard waste fed into yard waste bag 50 from escaping through secondary holes 48. That is, filter 60 filters the air escaping through screen 30 from the mulched yard waste in yard waste bag 50.

Filter 60 is constructed so that while it does not impeded the flow of air therethrough, it impedes the flow of yard waste out of yard waste bag 50 through screen 30 of yard waste device 15. Filter 60 is preferably fibrous and may comprise natural and/or man made fibers.

Yard waste bag 50 is preferably a widely available paper yard waste bag found in hardware stores, grocery stores, corner stores, members only stores and the like. The preferred bag is a thirty (30) gallon bag with dimensions of sixteen (16) inches in length, twelve (12) inches in width and thirty-five (35) inches in height. Such bags are typically purchased in bundles of five or more in a folded condition to make their transport easy. Such yard waste bags are universal and are well known to persons of skill in the art.

The uniqueness of the invention herein and its specific use of yard waste device 15 is that yard waste bag 50 may be of the widely available variety discussed hereinabove. The prior art uses specially made bags that must then be detached from a device to then dump its mulched and/or gathered contents into, for example, yard waste bag 50 contemplated herein. This invention removes that step and creates capacity of greater storage of mulched and collected yard waste. Furthermore, by use of the invention herein with the universal yard waste bag 50 described herein, time is saved in the collection, mulching and storage of yard waste. Because these thirty gallon bags are used instead of much smaller device designed bags, labor may also be saved.

Importantly, the system herein for collecting, mulching and storing yard waste is a closed system. By the term "closed system" it is meant herein that there are no interrupting or intervening steps between the collection, mulching and final collection of yard waste by the inventive system herein. Unlike the prior art, no intervening steps are needed for the final storage of yard waste into yard waste bag 50. In the prior art execution, a device's provided bag, usually of much lower capacity than that of the universal paper yard waste bag discussed extensively hereinabove, must be removed, dumped into another receptacle and then re-attached to a like collection and mulching device. This is a wasteful expenditure of time and effort. Such wasted time and effort often necessitates the use of additional labor. Wasted time and labor usage are costly and disadvantageous to commercial users, e.g., landscapers. The invention herein, by providing a closed system, removes those disadvantages and provides significant savings of time and labor.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bag fitting device for storing collected yard waste, comprising:
   a. A screen having a first side and second side positioned oppositely to said first side;
   b. A border positioned about said screen, said border enclosing said screen, said border having a first side, a second side positioned perpendicular to said first side, a third side positioned oppositely to said first side and perpendicular to said second side, and a fourth side positioned oppositely to said second side and perpendicular to said first side and said third side;
   c. A primary hole positioned within said screen, said primary hole having a first raised border on said screen first side and a second raised border on said screen second side;
   d. At least two secondary holes positioned within said screen, said bag fitting device being fittable within an opening of a "pliable container", said opening of said pliable container being closable about said bag fitting device;
   e. A collection device for collecting yard waste; and
   f. A mulching device connected to said collection device, Whereby said bag fitting device is connected to said mulching device, said bag fitting device is connectable to a bag for final collection of yard waste collected by said collection device said bag being movable with said collection device as said collection device collects said yard waste, wherein said bag fitting device substantially inflates said bag.

2. The bag fitting device of claim 1 wherein said bag fitting device is semi-rigid.

3. The bag fitting device of claim 2 wherein said bag fitting device is substantially rigid.

4. The bag fitting device of claim 2 wherein the diameter of said primary hole ranges from about 0.25 inches to about 6 inches.

5. The bag fitting device of claim 4 wherein the diameter of said primary hole ranges from about 2 inches to about 4 inches.

6. The bag fitting device of claim 5 wherein the diameter of each said secondary hole ranges from about 0.05 inches to about 1 inch.

7. The bag fitting device of claim 2 wherein the number of said secondary holes ranges from about 2 to about 800.

8. The bag fitting device of claim 2 wherein said second side of said screen comprises one or more ribs, each said rib extending at least partially between said first side to said third side.

9. The bag fitting device of claim 8 wherein said screen comprises between about 2 ribs to about 50 ribs.

10. The bag fitting device of claim 9 wherein said screen comprises between about 10 to about 30 ribs.

11. The bag fitting device of claim 1 wherein said border comprises at least two bag attachment clips.

12. The bag fitting device of claim 11 wherein said border comprises at least one bag attachment clip on said first side, said second side, said third side and said fourth side.

13. The bag fitting device of claim 1 wherein said first raised border and said second raised border of said primary hole are circular forming a cylinder.

14. The bag fitting device of claim 13 wherein said cylinder formed by said first raised border is the inlet.

15. The bag fitting device of claim 14 wherein said inlet comprises an attachable extender, said extender having a base, said base fitting within said inlet.

16. The bag fitting device of claim 15 wherein said cylinder formed by said second raised border is the outlet.

\* \* \* \* \*